(12) United States Patent
Ho (10) Patent No.: US 8,570,681 B2
(45) Date of Patent: Oct. 29, 2013

(54) DUAL CHANNEL HDD SYSTEMS AND METHODS

(75) Inventor: Son Hong Ho, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 85 days.

(21) Appl. No.: 13/352,744

(22) Filed: Jan. 18, 2012

(65) Prior Publication Data

US 2012/0182640 A1    Jul. 19, 2012

Related U.S. Application Data

(60) Provisional application No. 61/499,422, filed on Jun. 21, 2011, provisional application No. 61/434,370, filed on Jan. 19, 2011.

(51) Int. Cl.
*G11B 5/02* (2006.01)

(52) U.S. Cl.
USPC ................................. 360/55; 360/51; 360/49

(58) Field of Classification Search
None
See application file for complete search history.

(56) References Cited

U.S. PATENT DOCUMENTS

| | | | |
|---|---|---|---|
| 6,333,828 B1 * | 12/2001 | Morita et al. | 360/68 |
| 6,639,746 B1 | 10/2003 | Chung et al. | |
| 7,869,153 B1 | 1/2011 | Tan et al. | |
| 2004/0240095 A1 * | 12/2004 | Igari | 360/60 |
| 2008/0253023 A1 | 10/2008 | Lee | |
| 2009/0249161 A1 * | 10/2009 | Chiba | 714/752 |

OTHER PUBLICATIONS

PCT International Search Report; Seagate Product Marketing: "Get S.M.A.R.T. for Reliability", 1999, Seagate Technology, Inc., 920, Disc Drive, Scotts Valley, CA XP002672804, pp. 1-5.
PCT International Search Report and Written Opinion, Apr. 18, 2012.

* cited by examiner

*Primary Examiner* — Muhammad N Edun (57) ABSTRACT

A hard disk drive system includes a first channel module and a second channel module. The first channel module is configured to receive a first data from or transfer the first data to a first amplifier module of a hard disk assembly when reading from or writing to a first surface of a disk of the hard disk assembly. The second channel module is configured to receive a second data from or transfer the second data to a second amplifier module of the hard disk assembly when reading or writing to a second surface of the disk while the first channel module receives the first data from or transfers the first data to the first amplifier module.

18 Claims, 5 Drawing Sheets

DUAL CHANNEL HDD SYSTEMS AND METHODS

CROSS-REFERENCE TO RELATED APPLICATIONS

This application claims the benefit of U.S. Provisional Application No. 61/499,422, filed on Jun. 21, 2011 and U.S. Provisional Application No. 61/434,370, filed on Jan. 19, 2011. The disclosures of the above applications are incorporated herein by reference in their entirety.

FIELD

The present disclosure relates to hard disk drives, and more particularly to read and write access channels of hard disk drives.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A hard disk drive (HDD) may include a drive control module (or HDD system-on-a-chip (SOC) controller) and a hard disk assembly (HDA). The drive control module transfers data between a host interface and the HDA based on read and/or write command signals received from the host interface. The host interface may be connected to a host, such as, a computer.

The HDA includes one or more circular platters (i.e., disks), which have magnetic surfaces that are used to store data magnetically. The HDA may include two read and write heads (hereinafter, "heads") per disk. The heads are used to read data from and write data to magnetic surfaces of the disks. The data may include user data or servo data. User data refers to data transferred between the HDD and the host. Servo data refers to data written on a disk during, for example, a self-servo write process and used to indicate position of a head on a disk. The heads of a disk are mounted on opposing sides of the disk and on a head assembly. The head assembly is mounted on an end of an actuator arm. The actuator arm is moved relative to the disk by a voice coil motor (VCM).

Each of the disks may have tracks on both sides of the disk. The tracks on a first side of a disk are not aligned with second tracks on a second side of the disk. Because of this, one side of a disk is accessed at a time. In order to access a target location on a target side of the disk, the head assembly is moved and then the corresponding head for the target side of the disk is moved.

The drive control module may include a host interface control module, a buffer management module, a servo control module, a read and write channel module, and a hard disk control module. The host interface control module receives read and write command signals from the host and controls the transfer of user data between the host interface and the buffer management module. The buffer management module stores the user data received from the host interface in a buffer prior to being stored on the disks. The buffer management module also stores user data received from the disks prior to being transmitted to the host via the host interface.

The servo control module first positions the head assembly (referred to as a coarse adjustment) and then one of the heads of the head assembly (referred to as a fine adjustment) when reading from or writing to a side of a disk. For example, the servo control module positions the head assembly based on a first servo feedback signal from the read and write channel module when accessing a first side of the disk. The first servo feedback signal is initially generated via a preamplifier of the HDA. The first servo feedback signal is generated based on first servo data written on the first side of the disk and indicates a position of a first head on the first side of the disk. The servo control module then positions the first head to read from or write to a target location on the first side of the disk based on the first servo feedback signal.

In order to access data on a second side of the disk (opposite that of the first side of the disk), the servo control module may adjust the position of the head assembly and then adjust position of a second head on the second side of the disk. The servo control module adjusts the position of the head assembly and the second head based on a second servo feedback signal. The preamplifier module switches between reading servo information from the first side of the disk to reading servo information from the second side of the disk in order to generate the second servo feedback signal. The preamplifier module provides the second servo feedback signal to the read and write channel module. The second servo feedback signal indicates a position of the second head on the second side of the disk.

The read and write channel module forwards either the first servo feedback signal or the second servo feedback signal to the servo control module. The hard disk control module controls data transfer between the buffer management module and the HDA.

To increase HDD performance, read and write speeds of a HDD need to be increased. This requires spinning disks of a HDD at increased speeds. Although increasing rotational speeds of a disk can increase HDD performance (e.g., data transfer rates), operation at the increased rotational speeds have associated disadvantages. The disadvantages include increased power consumption, increased errors in electronic components of the HDD, and reduced signal-to-noise ratios (SNRs) of signals generated when performing read and write operations. Also, high-speed HDDs are more costly to manufacture than low-speed HDDs due the materials and quality of components needed to provide an appropriately operating HDD.

In addition to increased HDD performance requirements, HDD storage density requirements are also increasing. In general, as storage density requirements increase, a HDD is more costly to manufacture because of longer times needed to perform self-servo write procedures and defect scanning and factory burn-in procedures (i.e. test procedures performed during manufacturing).

SUMMARY

A hard disk drive system is provided and includes a first channel module and a second channel module. The first channel module is configured to receive a first data from or transfer the first data to a first amplifier module of a hard disk assembly when reading from or writing to a first surface of a disk of the hard disk assembly. The second channel module is configured to receive a second data from or transfer the second data to a second amplifier module of the hard disk assembly when reading or writing to a second surface of the disk while the first channel module receives the first data from or transfers the first data to the first amplifier module.

In other features, the first channel module is configured to read the first data from the first surface while the second channel module reads the second data from the second surface. In other features, the first channel module is configured to write the first data to the first surface while the second channel module writes the second data to the second surface.

In other features, the hard disk drive system further includes a buffer management module configured to receive sectors of data from or transfer the sectors of data to a buffer. The sectors of data include the first data and the second data. In other features, the buffer management module includes a first access module and a second access module. The first access module is configured to transfer the first data between the buffer and a first control module. The second access module is configured to transfer the second data between the buffer and a second control module while the first access module transfers the first data between the buffer and the first control module.

In other features, the first control module includes a first defect module, a first sector tracking module, and a first formatting module. The first defect module configured to map defective sectors on the first surface of the disk. The first sector tracking module configured to track an access location at which the first data is read from or written to the first surface of the disk. The first formatting module configured to track a first format of the first data. The second control module includes a second defect module, a second sector tracking module, and a second formatting module. The second defect module is configured to map defective sectors on the second surface of the disk. The second sector tracking module configured to track an access location at which the second data is read from or written to the second surface of the disk. The second formatting module configured to track a second format of the second data. At least one of the first channel module and the second channel module report a total amount of space on the disk to a host based on the map of the defective sectors on the first surface of the disk and the map of the defective sectors on the second surface of the disk.

In other features, the first surface is on a first side of the disk and the second surface is on a second side of the disk and opposes the first surface. In other features, the hard disk drive system further includes the hard disk assembly. The hard disk assembly includes a first head and a second head. The first head is configured to read the first data from or write the first data to the first surface. The second head is configured to read the second data from or write the second data to the second surface at a same time as the first head reading the first data from or writing the first data to the first surface.

In other features, the hard disk drive system further includes a first servo head module, a first driver module, a second servo head module and a second driver module. The first servo head module is configured to generate a first servo signal based on a first feedback signal from the first channel module. The first driver module is configured to drive a first actuator of the first head based on the first servo signal. The second servo head module is configured to generate a second servo signal based on a second feedback signal from the second channel module. The second driver module is configured to drive a second actuator of the second head based on the second servo signal while the first driver module drives the first actuator.

In other features, the hard disk drive system further includes a self-servo write module configured to generate a first servo write signal while generating a second servo write signal. The first channel module writes first servo data on the first surface. The second channel module writes second servo data on the second surface while the first channel module write the first servo data on the first surface.

In other features, a method of operating a hard disk drive system is provided. The method includes receiving first data from or transferring the first data to a first amplifier module of a hard disk assembly via a first channel module when reading from or writing to a first surface of a disk of the hard disk assembly. Second data is received from or transferred to a second data a second amplifier module of the hard disk assembly via a second channel module when reading or writing to a second surface of the disk while receiving the first data from or transferring the first data to the first amplifier module via the first channel module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

In the following description, various terms are used to describe the physical relationship between components. When a first element is referred to as being "on", "engaged to", "connected to", or "coupled to" a second element, the first element may be directly on, engaged, connected, disposed, applied, or coupled to the second element, or intervening elements may be present. In contrast, when an element is referred to as being "directly on", "directly engaged to", "directly connected to", or "directly coupled to" another element, there may be no intervening elements present. Other words used to describe the relationship between elements should be interpreted in a like fashion (e.g., "between" versus "directly between", "adjacent" versus "directly adjacent", etc.).

Although the terms first, second, third, etc. may be used herein to describe various elements, components, modules, channels and/or heads, these elements, components, modules, channels and/or heads should not be limited by these terms. These terms may be only used to distinguish one element, component, module, channel or head from another element, component, module, channel or head. Terms such as "first," "second," and other numerical terms when used herein do not imply a sequence or order unless clearly indicated by the context. Thus, a first element, component, module, channel or head discussed below could be termed a second element, component, module, channel or head without departing from the teachings of the example embodiments.

Figure 1:
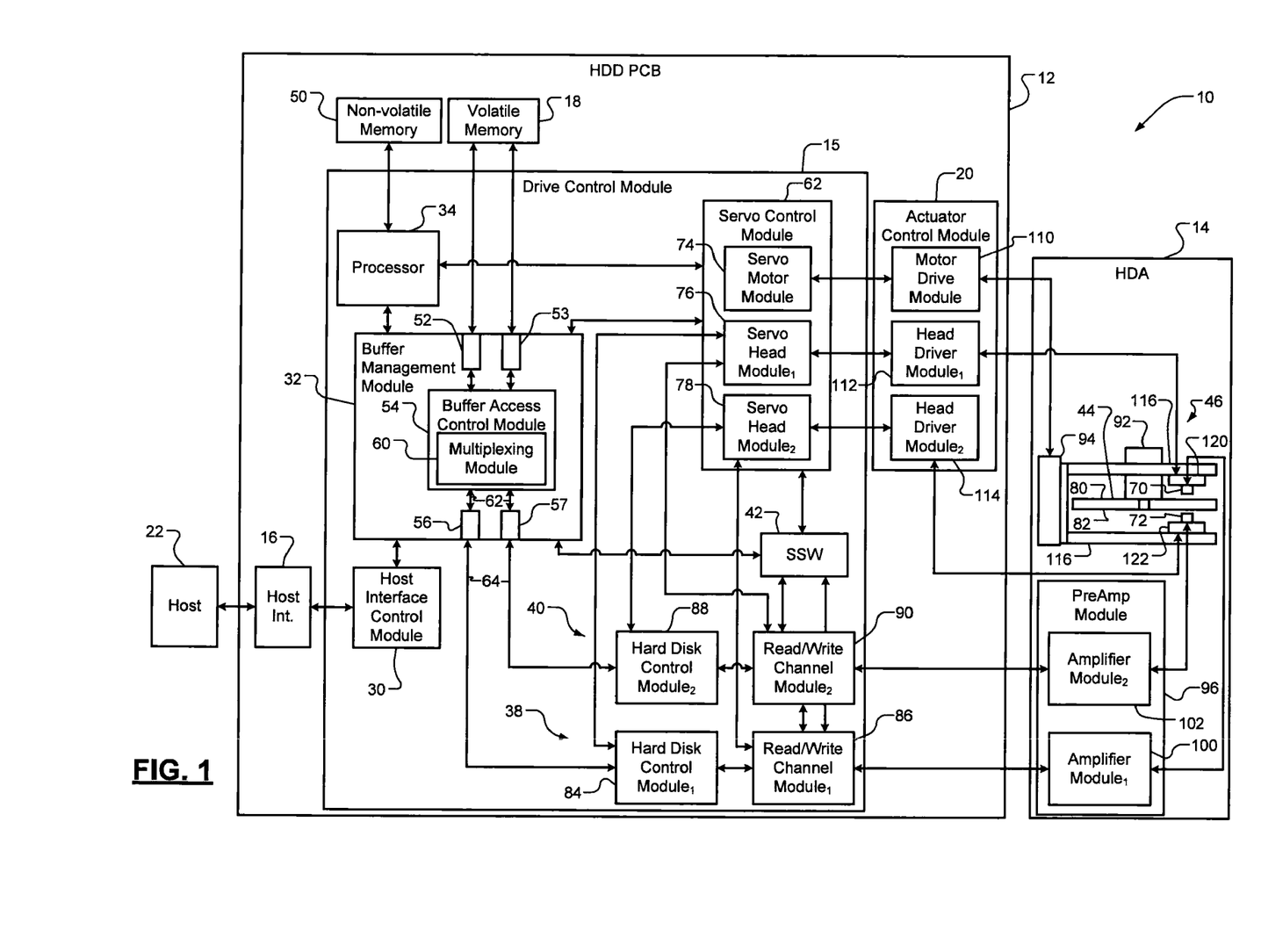
FIG. 1 is a functional block diagram of a hard disk drive system in accordance with the present disclosure.

In FIG. 1, a hard disk drive (HDD) system 10 of a HDD is shown. The HDD system 10 includes a HDD printed circuit board (HDD PCB) 12 and a hard disk assembly (HDA) 14. The HDD PCB 12 includes a drive control module 15, a host interface 16, a volatile memory (buffer) 18, and an actuator control module 20. The drive control module 15 receives user data from a host 22 and transfers user data to the host 22 via the host interface 16. The host 22 may be a computer, a television, a display, a cellular phone, a personal data assistant, etc. The host interface 16 may be a serial advanced technology attachment (SATA) interface, a universal serial bus (USB) interface, an integrated drive electronics (IDE) interface (or parallel advanced technology attachment (ATA) interface), a fiber channel interface, etc. The drive control module 15 also controls the transfer of user data and servo data between the drive control module 15 and the HDA 14.

The drive control module 15 includes a host interface control module 30, a buffer management module 32, a processor 34, a servo control module 62, a first read and write (read/write) path 38, a second read/write path 40, and a self-servo write (SSW) module 42. The host interface control module 30 may be connected between the host interface 16 and the buffer management module 32. The host interface control module 30 may convert data signals to and from data formats acceptable to the host 22.

The buffer management module 32 may receive user data to be stored in the HDA 14 from the host 22. The HDA 14 may include one or more circular platters or disks (one disk 44 is shown), which have magnetic surfaces that are used to store data magnetically. The data can be stored in either a continuous media format or bit-patterned format on the disk(s). Although the HDA 14 is shown as having a single disk 44 and a single head assembly 46, the HDA 14 may include any number of disks and head assemblies. The buffer management module 32 may also transmit data accessed from the HDA 14 to the host 22.

The buffer management module 32 may control operation of the HDD system 10 including transferring, scheduling and storing data to and from the HDA 14, the host interface 16, and the volatile memory 18. This control may be based on commands and status information transferred between the host and the HDD system 10 and/or between the drive control module 12 and the HDA 14. The commands and status information may be provided to the processor 34.

The processor 34 may process data, including encoding, decoding, filtering, and/or formatting prior to and/or subsequent to storing the data in the HDA 14. The processing may be based on the commands and/or status information. The processor 34 may have dedicated non-volatile memory 50 on the HDD PCB 12. The non-volatile memory 50 may store an operating system, which is used to boot up the HDD system 10. Portions and/or a copy of the operating system may be stored in HDA 14 and/or on both sides of a disk 44 using disk access techniques disclosed herein.

The buffer management module 32 also controls buffering of data between the host 22 and the HDA 14. The buffer management module 32 may temporarily store data received from the host 22 and/or the HDA 14 in the volatile memory 18. The data may be stored in the volatile memory 18 until being forwarded respectively to the host 22 and/or the HDA 14. The volatile memory 18 is used to prevent a bottleneck when transferring data between the host 22 and the HDA 14. The volatile memory 18 may include, for example, double-data rate (DDR) memory and/or DDR synchronous dynamic random access memory (DDR SDRAM).

The buffer management module 32 includes one or more buffer ports 52, 53 a buffer access control module 54, and HDC ports 56, 57. Each of the buffer ports 52, 53 and/or the HDC ports 56, 57 may be associated with an access channel and a respective one of the read/write paths 38, 40. The buffer access control module 54 may access multiple locations within the volatile memory 18 during the same period of time via the buffer ports 52, 53. The buffer access control module 54 tracks locations of sectors of data in the buffer 18 associated with each of the heads 70, 72 when reading sectors of data from or writing sectors of data in the buffer 18. This may be accomplished, for example, using buffer pointers to refer to previous and current buffer access locations.

The pointers may point to buffer locations of, for example, odd and even sector numbers of a series of sectors of data. The odd sectors may be read from or written to the first side 80 via the first head 70. The even sectors may be read from or written to the second side 82 via the second head 72.

As another example, portions of odd and even sectors of data may be read from or written to the sides 80, 82 during the same period of time. A first pointer may be used to point to a first buffer location associated with a first portion of a first (odd) sector to be read from or written to the first side 80 via the first head 70. A second pointer may point to a second buffer location associated with a first portion of a second (even) sector to be read from or written to the second side 82 via the second head 72. Subsequent to reading or writing the first and second portions, the first pointer may be switched to a second portion of the first sector and the second pointer may be switched to a second portion of the second sector.

As yet another example, first portions of sectors may be read from or written on the first side 80 while second portions of the sectors may be read from or written on the second side 82. A first pointer may be used to point to a first buffer location associated with a first portion of a first sector to be read from or written to the first side 80 via the first head 70. A second pointer may point to a second buffer location associated with a second portion of the first sector to be read from or written to the second side 82 via the second head 72. Subsequent to reading or writing the first and second portions of the first sector, the first pointer may be switched to a first portion of a second sector and the second pointer may be switched to a second portion of the second sector.

The buffer access control module 54 may transfer data in parallel between a first one of the buffer ports 52 and a first one of the HDC ports 56 while transferring data between a second one of the buffer ports 53 and a second one of the HDC ports 57. Data may be transferred between the buffer access control module 54 and the first read/write path 38 via the first HDC port 56 while data is transferred between the buffer access control module 54 and the second read/write path 40 via the second HDC port 57.

The buffer management module 32 may include any number of buffer and HDC ports. The buffer management module 32 may include fewer buffer ports than HDC ports. For example, the buffer access control module 54 may include a multiplexing module 60. The multiplexing module 60 may include a multiplexer and a demultiplexer. During a write operation, the multiplexing module 60 may demultiplex data transferred from one of the buffer ports 52, 53 to generate two user data signals 62 during a write operation. Each of the user data signals 62 may be received at a respective one of the HDC ports 56, 57. During a read operation, user data signals 64 received from the read/write paths 38, 40 at the HDC ports 56, 57 may be multiplexed to generate a single user data signal, which may be provided to one of the buffer ports (e.g., the first buffer port 52 or the second buffer port 53). The buffer access control module 54 may generate control signals to control operation of the multiplexing module 60.

The servo control module 36 controls positions of the head assembly 46 and associated heads 70, 72 and rotational speeds of the disk 44. The servo control module 36 includes a servo motor module 74, a first servo head module 76 and a second servo head module 78. The first servo head module 76 adjusts position of the first head 70 on a first surface or side 80 of the disk 44. The second servo head module 78 adjusts position of a second head 72 on a second surface or side 82 of the disk 44. The servo head modules 76, 78 may operate in parallel to adjust positions of the heads 70, 72 during the same period of time.

The first read/write path 38 includes a first hard disk control (HDC) module 84 and a first read/write channel module 86. The second read/write path 40 includes a second HDC module 88 and a second read/write channel module 90.

The HDC modules 84, 88 control access to the HDA 14. The HDC modules 84, 88 may control access to elements of the HDA 14 including the disk 44, the heads 70, 72, a spindle motor 92, a voice coil motor (VCM) 94, a preamplifier module 96, etc. The HDC modules 84, 88 may perform defect management, location tracking, and disk formatting tasks. The defect management tasks include generating a defect map of defective sectors of data on both of the sides 80, 82. Sectors of data may be referred to herein as "sectors". Location tracking tasks include tracking user data and/or sector locations of user data on both sides 80, 82 of the disk 44. Disk formatting tasks include determining formats of sectors of data stored on both of the sides 80, 82. Defect management, location tracking, and disk formatting tasks are described in further detail below with respect to FIGS. 2-4.

The HDC modules 84, 88 and/or the processor 34 may control the servo motor module 74 and/or a respective one of the servo head modules 76, 78. The HDC modules 84, 88 and/or the processor 34 may monitor the servo control module 36, the servo motor module 74, and the servo head modules 76, 78. The HDC modules 84, 88 may determine whether the heads 70, 72 are in correct positions and ready to access the disk 44. The HDC modules 84, 88 and/or the processor 34 may track, store and update position alignment offsets between the first head 70 and the second head 72 when accessing both of the sides 80, 82. The position alignment offsets refer to differences in lateral positions of the heads 70, 72 across opposing magnetic surfaces of the disk 44. The HDC modules 84, 88 and/or the processor 34 may track the position alignment offsets based on servo feedback signals received from the read/write channel modules 86, 90.

The read/write channel modules 86, 90 control reading from and writing to operations performed on magnetic surfaces of the disk 44, as performed by the heads 70, 72. The read/write channel modules 86, 90 generate access signals that are amplified by respective amplifier modules 100, 102 of the preamplifier module 96 prior to being sent to the heads 70, 72. The amplifier modules 100, 102 may also amplify signals received from the heads 70, 72 prior to being sent to the read/write channel modules 86, 90. The amplifier modules 100, 102 generate a write current that flows through the write elements of the heads 70, 72 when writing data. The write current is used to produce magnetic fields on the magnetic surfaces of the disk 44.

Magnetic surfaces of the disk 44 induce low-level analog signals in the read elements of the heads 70, 72 during reading of the disk 44. The read elements may be used to read tracks on both of the sides 80, 82. The amplifier modules 100, 102 amplify the low-level analog signals and output amplified analog signals to the read/write channel modules 86, 90. The amplified analog signals may include user data signals and servo data signals. User data signals may be provided from both heads 70, 72 during the same period of time. Servo data signals from both heads 70, 72 may be provided during the same period of time. The SSW module 42 may write the servo data on the disk 44 using the heads 70, 72 prior to user data being stored on the disk 44. The servo data may be stored on each side of the disk 44 and is monitored to ensure that user data is written to and read from correct locations on the disk 44. This may occur during a self-servo write method, as described with respect to FIG. 3.

The actuator control module 20 includes a motor driver module 110, a first head driver module 112 and a second head driver module 114. The motor driver module 110: actuates the VCM 94 to adjust position of the head assembly 46; and adjusts speed of a spindle motor 92 to adjust rotational speed of the disk 44. As an example, the servo motor module 74 may generate commands that control the speed of the spindle motor 92 and the position of one or more actuator arm(s) 116 of the head assembly 46. The servo motor module 74 positions the actuator arm(s) 116 based on servo data and/or positioning information received from the read/write channel modules 86, 90, the HDC modules 84, 88 and/or the processor 34. The motor driver module 110 implements the commands and generates motor control signals (e.g., a VCM control signal and a spindle control signal) that control the speed of the spindle motor 92 and the positioning of the actuator arm(s) 116.

The servo head modules 76, 78 position the heads 70, 72 over respective surfaces and sides of the disk 44 during read and write operations. The servo head modules 76, 78 position the heads 70, 72 based on servo data and/or positioning information received from the read/write channel modules 86, 90, the HDC modules 84, 88 and/or the processor 34. The servo head modules 76, 78 generate head control signals to control positions of the heads 70, 72.

The HDA 14 includes the head assembly 46 and the preamplifier module 96. The head assembly 46 includes the disk 44, the spindle motor 92, the VCM 94, and the actuator arm(s) 116. The spindle motor 92 rotates the disk 44 based on the spindle control signal from the motor driver module 110. The VCM 94 adjusts position of the actuator arm(s) 116 relative to the disk 44 based on the VCM control signal from the motor driver module 110.

The head assembly 46 may be located on a distal end of the actuator arm(s) 116 and includes a first head 70, a second head 72, a first head actuator 120 and a second head actuator 122. The heads 70, 72 each include a write element, such as an inductor, that generates a magnetic field and a read element, such as a magneto-resistive (MR) element, that senses the magnetic field on the disk 44. The head actuators 120, 122 move the heads 70, 72 relative to the disk 44. The head actuators 120, 122 may be micro-actuators, micro-electromechanical actuators, piezo-electric actuators, etc. The head actuators 120, 122 may be capable of moving (micro-jogging) the heads a predetermined number of tracks. The disk 44 may be arranged in a stack of disks.

The preamplifier module 96 includes the amplifier modules 100, 102. Each of the amplifier modules 100, 102 may be associated with a respective one of each of the heads 70, 72, the head actuators 120, 122, and the read/write paths 38, 40. The amplifier modules 100, 102 receive servo information (or servo data) read from tracks on each of the sides 80, 82 from the heads 70, 72. The amplifier modules 100, 102 also transfer user data between the read/write channel modules 86, 90 and the heads 70, 72.

The drive control module 15, the volatile memory 18, the non-volatile memory 50, the actuator control module 20, and the preamplifier module 96 may each be a system-on-a-chip (SOC). The drive control module 15, the volatile memory 18, the non-volatile memory 50, and the actuator control module 20 may be mounted on the HDD PCB 12. The preamplifier module 96 maybe included in the HDA 14. The HDD PCB 12 may be connected to and/or mounted on the HDA 14, such as on a case (not shown) of the HDA 14.

Figure 2:
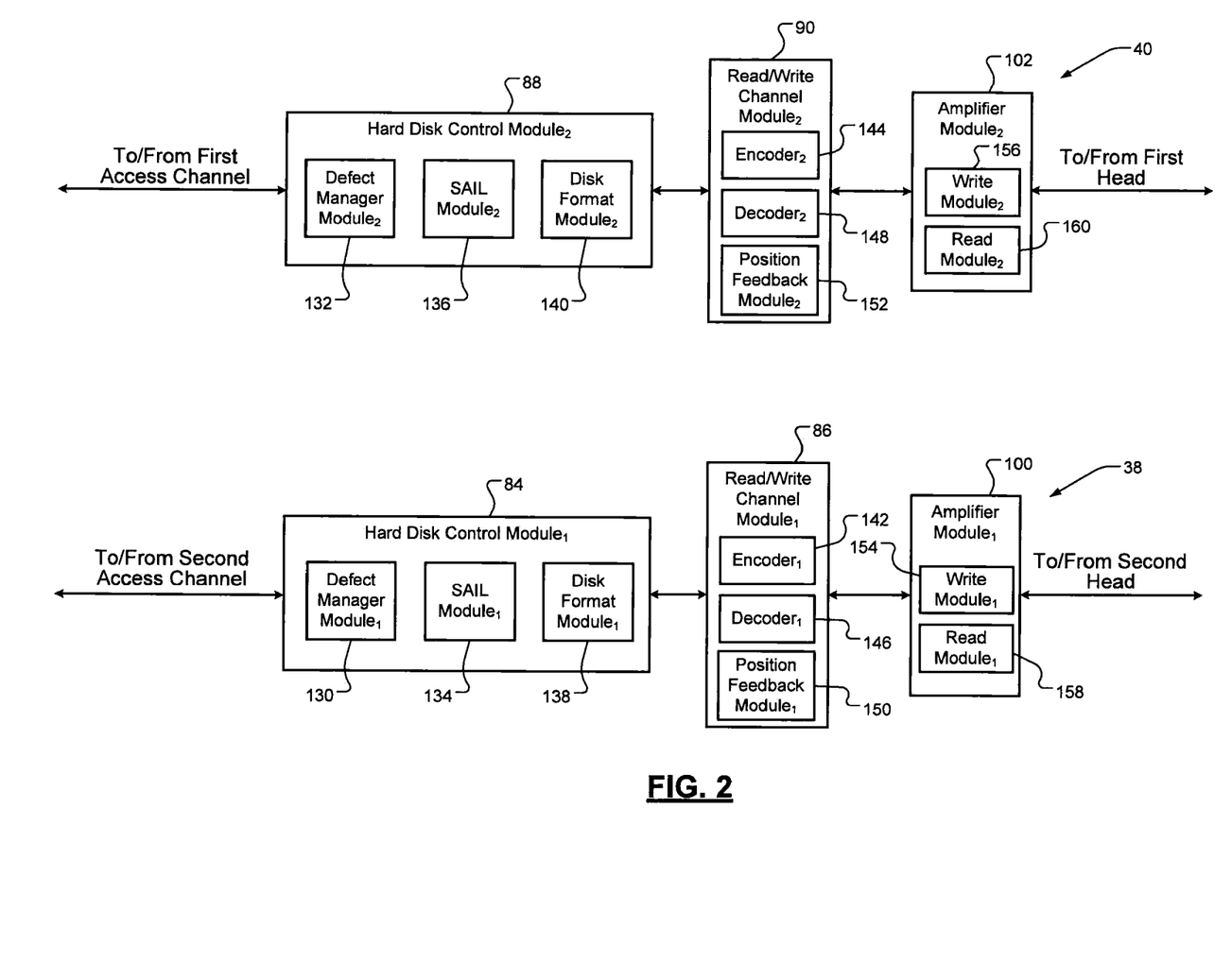
FIG. 2 is a functional block diagram of read and write paths in accordance with the present disclosure.

Referring now also to FIG. 2, the read/write paths 38, 40 are shown. The first read/write path 38 includes the first HDC module 84 and the first read/write channel module 86. The second read/write path 40 includes the second HDC module 88 and the second read/write channel module 90. The first read/write path 38 is connected to the first amplifier module 100. The second read/write path 40 is connected to the second amplifier module 102.

The HDC modules 84, 88 may include respective defect manager modules 130, 132, sector address identifier less (SAIL) modules 134, 136 (may be referred to as sector address modules 134, 136), and disk format modules 138, 140. The defect manager modules 130, 132 may include hardware to map out locations of defective sectors on a respective side of the disk 44. The maps may be stored in the HDC modules 84, 88, the volatile memory 18 or in other non-volatile memory 50 and used when accessing the disk 44. The HDC modules 84, 88 may report a total amount of space in which user data may be stored on the disk 44. The total amount of space may not include the defective sectors. For this reason, the disk 44 may be perceived by the host 22 as not having any defective sectors. The maps may be used by the HDC modules 84, 88 when transferring user data between the access channels of the buffer management module 32 and the disk 44.

The SAIL modules 134, 136 track sector locations of user data on the disk 44. The SAIL modules 134, 136 may derive sector numbers from servo numbers based on the servo feedback signals. The HDC modules 84, 88 may not write disk address locations on the disk 44 when writing user data on the disk 44. The SAIL modules 134, 136 may track start and/or end points of user sectors on the disk 44 and access the disk 44 based on the start and/or end points and, for example, a number of bytes, symbols, pages, and/or sectors to be transferred. The SAIL modules 134, 136 may track the rotational locations of the user data based on the servo feedback signals received from the amplifier modules 100, 102.

The disk format modules 138, 140 track formats of sectors stored on the disk 44. The formats have corresponding format information including: number of bytes, symbols, pages and/or sectors to read or write, a byte or symbol format, location of a sync mark, information in a preamble, etc. The sync mark may be used by the HDC modules 84, 88 and/or the read/write channel modules 86, 90 to determine where targeted user data starts on the disk 44.

The read/write channel modules 86, 90 may include respective encoders 142, 144, decoders 146, 148, and/or position feedback modules 150, 152. The encoders 142, 144 may be used to encode user data prior to being written on the disk 44. During write operations, the read/write channel modules 86, 90 may encode user data to increase reliability by using error-correcting codes (ECC) such as a run length limited (RLL) code, a Reed-Solomon code, a low-density parity check (LDPC) code, etc. The read/write channel modules 86, 90 then transmit the encoded data to the amplifier modules 100, 102.

The decoders 146, 148 may be used to decode user data read from the disk 44. During read operations, the read/write channel modules 86, 90 receive analog signals from the amplifier modules 100, 102. The read/write channel modules 86, 90 convert the analog signals into digital signals, which are decoded to recover the original user data.

The position feedback modules 150, 152 transfer servo information in the form of servo feedback signals from the amplifier modules 100, 102 to the servo control module 36, the servo motor module 74 and/or the servo head modules 76, 78. The servo information may be embedded on both of the sides 80, 82.

When one of the sides 80, 82 has a defect causing unreliable feedback information, the feedback information (servo or burst information) on the other side may be used. Although the heads 70, 72 may not be directly aligned with each other, the heads 70, 72 are sufficiently aligned such that servo numbers (or wedge IDs) are the same. For this reason, the feedback information on the side with the non-defective feedback information may be relied on when read from or writing to the side with the defective information. Although servo data on a side of a disk has defective servo information, the corresponding user data sector(s) may not be defective. For these reasons, reliance on servo data on one side of a disk, allows user data to be reliably read from and/or written to both sides of the disk when one of the sides has defective servo data. This is unlike traditional HDD systems, which read from or write to one side of a disk at a time. In a traditional HDD system, when servo data of a disk is defective: the traditional HDD system may be unable to read from or write to the disk; attempts to write from a beginning point on the disk instead of a target point; and/or attempts to accesses the disk based on assumptions. This can result in unreliable user data.

The amplifier modules 100, 102 may be active at the same time to allow reading and writing operations to be performed on both of the sides 80, 82 during the same period of time. The amplifier modules 100, 102 include respective write modules 154, 156 and read modules 158, 160. The modules 154-160 may include positive emitter coupled logic (PECL) devices. The write modules 154, 156 receive encoded user data from the encoders and write the user data on to corresponding sides of the disk 44 via the heads 70, 72. The read modules 158, 160 read encoded user data and servo data from both sides of the disk 44. This includes amplifying encoded analog signals generated by the heads 70, 72 and transferring the amplified encoded analog signals to the read/write channel modules 86, 90.

Figure 3:
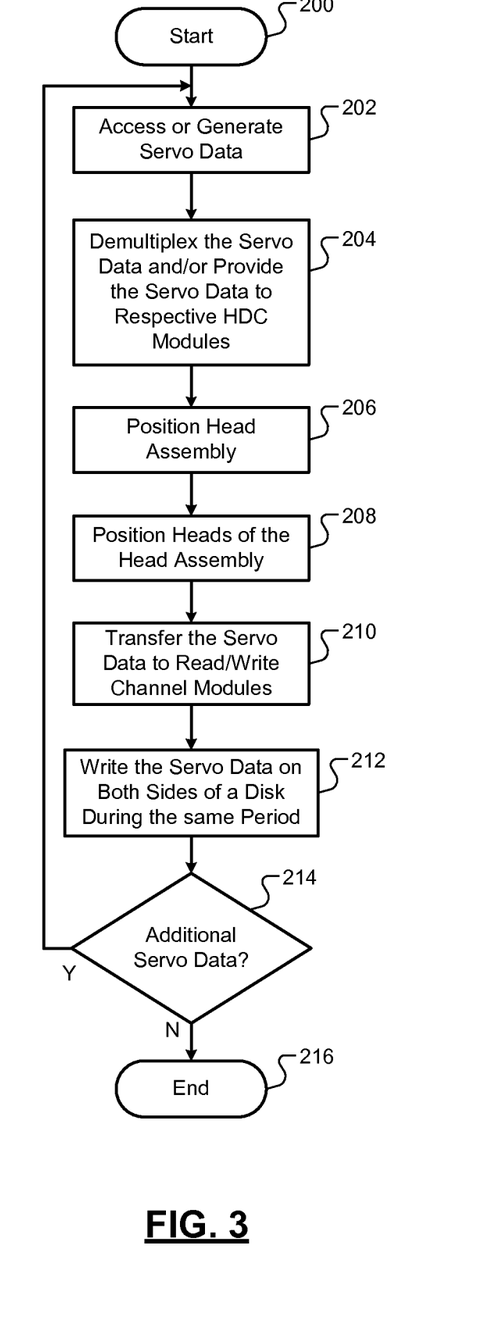
FIG. 3 illustrates a self-servo write method in accordance with the present disclosure.
Figure 4:
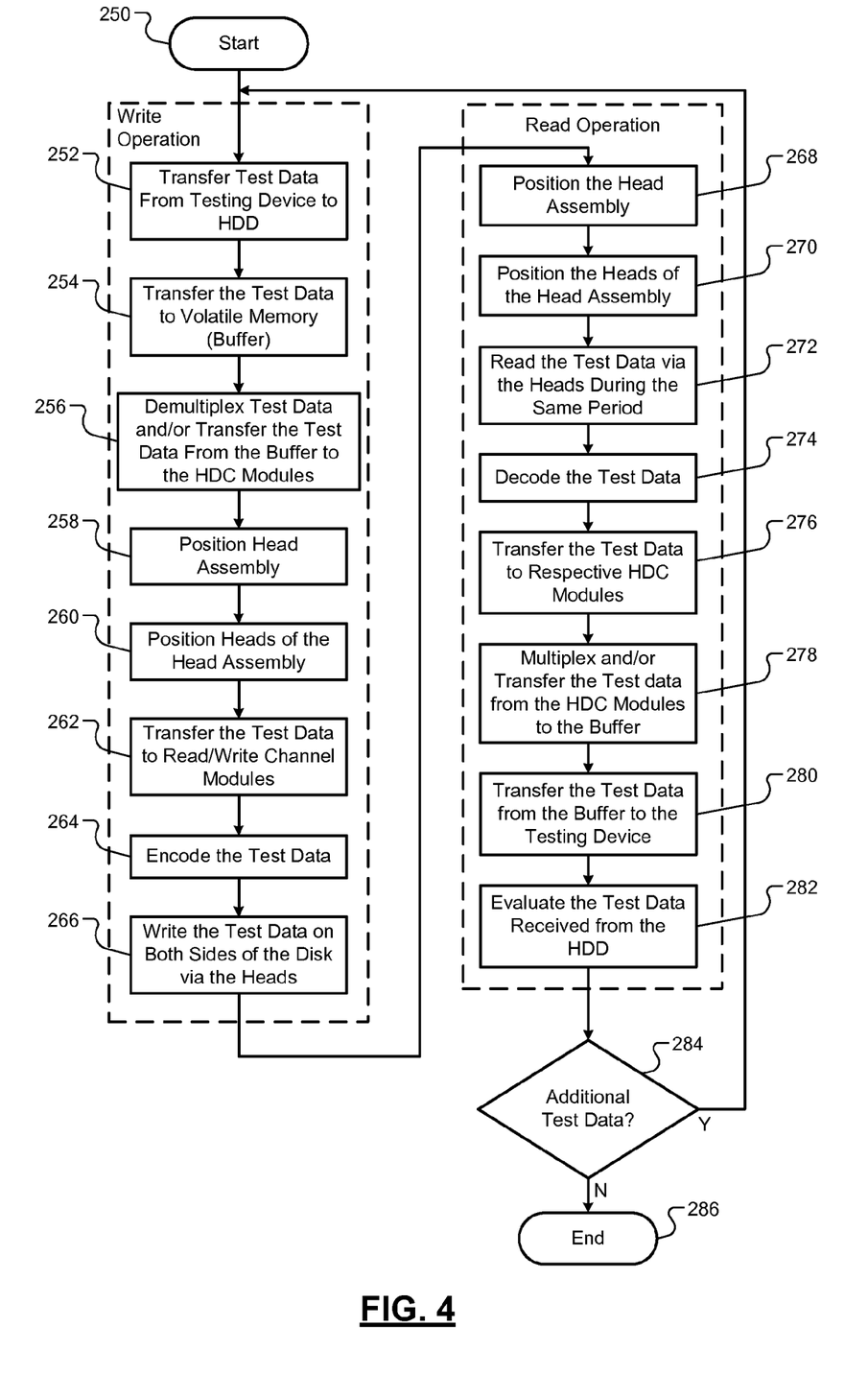
FIG. 4 illustrates a method of testing a hard disk drive system in accordance with the present disclosure.
Figure 5:
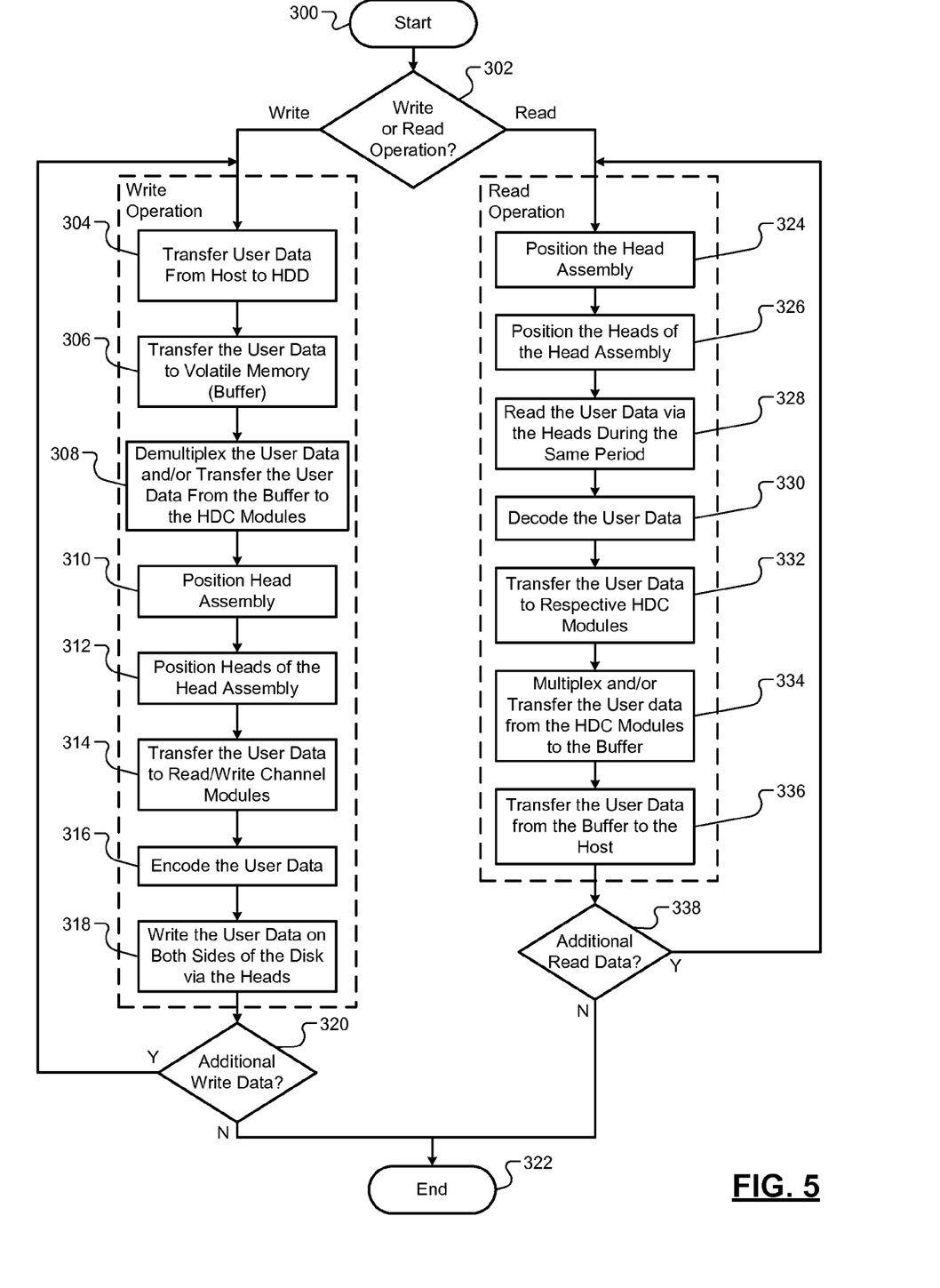
FIG. 5 illustrates a method of operating a hard disk drive system in accordance with the present disclosure.

The HDD system 10 may be operated using numerous methods, example methods of operating the HDD system 10 are provided by the methods of FIGS. 3-5. In FIG. 3, a self-servo write method is shown. Although the following tasks are primarily described with respect to the implementations of FIGS. 1-2, the tasks may be easily modified to apply to other implementations of the present disclosure. The tasks may be iteratively performed. The method of FIG. 3 may begin at 200. This method includes writing servo patterns by a HDD without use of a traditional servo track writer. A first servo pattern is written on the first side 80 of the disk 44 while a second servo pattern is written on the second side 82 of the disk 44.

At 202, the buffer management module 32 may generate and/or access servo data to be written on the disk 44. The servo data may be generated based on a clock signal and/or be obtained from, for example, the volatile memory 18 and/or the non-volatile memory 50. Servo data stored in the volatile memory 18 may be received from a host 22 via the host interface 16.

At 204, the servo data may be demultiplexed and/or provided from the buffer management module 32 to the HDC modules 84, 88.

At 206, the servo motor module 74 positions the head assembly 46. The servo motor module 74 may position the head assembly 46 based on servo feedback signals generated by the read/write channel modules 86, 90, previously written spiral or sectional servo tracks, sync marks, and/or other starting marks previously written on the disk 44. The servo feedback signals may be generated based on position and timing information previously written as the spiral or sectional servo tracks on the disk 44. The head assembly 46 may be positioned based on the position and timing information. The timing information may be used to determine a current radial and circumferential position of the read/write head.

At 208, the servo head modules 76, 78 position the heads 70, 72 on a pair of tracks relative to the disk 44 and relative to the actuator arms 116 to write the servo data. The servo head modules 76, 78 may position the heads 70, 72 based on the servo feedback signals generated by the read/write channel modules 86, 90, previously written spiral or sectional servo tracks, position and timing information associated with the spiral or sectional servo tracks, sync marks, and/or other starting marks previously written on the disk 44.

At 210, the HDC modules 84, 88 transfer the servo data to the read/write channel modules 86, 90. The first HDC module 84 may transfer first servo data to the first read/write channel module 86 while the second HDC module 88 transfers second servo data to the second read/write channel module 90.

At 212, the amplifier modules 100, 102 write the servo data on both of the sides 80, 82 of the disk 44 based on the timing information. The first amplifier module 100 writes the first servo data via the first head 70 on the first surface or side 80 while the second amplifier module 102 writes the second servo data via the second head 72 on the second surface or side 82. This may include writing servo tracks or writing servo data (servo wedges) to concentric user data tracks on each of the sides 80, 82.

At 214, the buffer management module 32 may determine whether additional servo data is to be written to the disk 44. The buffer management module 32 may return to task 202 when there is additional servo data to be written to the disk 44. The method may end at 216 when there is not additional servo data to be written to the disk 44.

In FIG. 4, a method of testing a HDD system (e.g., the HDD system 10) is shown. This method may be used when performing defect scanning or other test procedures. Although the following tasks are primarily described with respect to the implementations of FIGS. 1-2, the tasks may be easily modified to apply to other implementations of the present disclosure. The tasks may be iteratively performed. Also, not all of the tasks need to be performed and could be performed in a different order than provided below. The method of FIG. 4 may begin at 250.

At 252, test data is received from a testing device (or host) via the host interface 16 and/or a command signal to write the test data on the disk 44. At 254, the buffer management module 32 stores the test data in the volatile memory (or buffer) 18. At 256, the buffer management module 32 demultiplexes the test data and/or transfers the test data from the buffer 18 to the HDC modules 84, 88 based on the command signal. In one implementation, the buffer management module 32 may transfer first sectors (e.g., odd sectors in a series of sectors) to the first HDC module 84 and second sectors (e.g., even sectors in the series of sectors) to the second HDC module 88. Odd sectors may refer to sectors having odd physical sector numbers (PSNs). Even sectors may refer to sectors having even PSNs. In another implementation, the buffer management module 32 transfers a first portion of a first sector or first portions of the series of sectors to the first HDC module 84 and a second portion of the first sector, a first portion of a second sector, or second portions of the series of sectors to the second HDC module 88.

At 258, the servo motor module 74 positions the head assembly 46. The servo motor module 74 may position the head assembly 46 based on servo feedback signals received from the read/write channel modules 86, 90. At 260, the servo head modules 76, 78 position the heads 70, 72 on a pair of tracks relative to the disk 44 and relative to the actuator arms 116 based on the servo feedback signals.

At 262, the HDC modules 84, 88 transfer the test data to the read/write channel modules 86, 90. This may include transferring, for example, the odd sectors to the first read/write channel module 86 and the even sectors to the second read/write channel module 90. Alternatively, the first portion of the first sector or the first portions of the series of sectors may be transferred to the first read/write channel module 86 and the second portion of the first sector, the first portion of the second sector, or the second portions of the series of sectors may be transferred to the second read/write channel module 90.

At 264, the read/write channel modules 86, 90 may encode the series of sectors of test data received from the HDC modules 84, 88. The encoding may include adding error correction coding (ECC) data to each of the sectors of test data. The ECC data may be added to each sector and/or each portion of a sector transferred to the read/write channel modules 86, 90. For example, ECC data may be added to each of the odd and the even sectors by a corresponding one of the encoders 142, 144. As another example, first ECC data may be added to a first portion of a first sector via the first encoder 142 while second ECC data is added to a second portion of the first sector via the second encoder 144. ECC data may be similarly added to portions of other sectors of test data.

At 266, the amplifier modules 100, 102 write the test data and the ECC data on both of the sides 80, 82 via the heads 70, 72 during the same period of time. The first amplifier module 100 writes first test data and first ECC data on the first side 80 while the second amplifier module 102 writes second test data and second ECC data on the second side 82. The first test data may include one or more sectors or only a portion of a sector. The second test data may include one or more sectors or only a portion of a sector.

At 268, the servo motor module 74 positions the head assembly 46 for a read operation based on a control signal received from the buffer management module 32. The control signal may be generated based on a second command signal received from the test device. The head assembly 46 may be positioned based on the servo feedback signals. At 270, the servo head modules 76, 78 position the heads 70, 72 on a pair of tracks relative to the disk 44 and relative to the actuator arms 116 based on the servo feedback signals.

At 272, the amplifier modules 100, 102 read test data from both sides of the disk 44 during the same period of time. The first amplifier module 100 reads first test data from the first side 80 while the second amplifier module 102 reads second test data from the second side 82. At 274, the read/write channel modules 86, 90 decode the test data via the decoders 146, 148 including removing the ECC data added during the write operation. The first decoder 146 may decode the first test data while the second decoder 148 decodes the second test data.

At 276, the decoded test data is transferred from the read/write channel modules 86, 90 to the HDC modules 84, 88 during the same period. At 278, the buffer management module 32 multiplexes the test data (including the first test data and the second test data) and/or transfers the test data to the buffer 18.

At 280, the test data transferred to the buffer 18 from the buffer management module 32 is transferred back to the testing device via the host interface 16. At 282, the testing device evaluates the test data. This may include comparing the test data received from the HDD to the original test data transferred to the HDD. At 284, the buffer management module 32 may determine whether additional test data is to be transferred to the disk 44. If there is additional test data to be transferred to the disk 44, task 252 may be performed, otherwise the method may end at 286.

Tasks 252-266 may be iteratively performed prior to performing task 268 to store test data in all of the sectors on both of the sides 80, 82. Tasks 268-282 may be iteratively performed subsequent to filling all of the sectors on both of the sides 80, 82.

In FIG. 5, a method of operating a HDD system (e.g., the HDD system 10) is shown. Although the following tasks are primarily described with respect to the implementations of FIGS. 1-2, the tasks may be easily modified to apply to other implementations of the present disclosure. The tasks may be iteratively performed. The method of FIG. 5 may begin at 300. Also, not all tasks need to be performed and could be performed in a different order than provided below.

At 302, the HDD receives a command signal from the host 22 to perform a write or read operation. Tasks 304-320 may be performed when the HDD is to perform a write operation. Tasks 324-338 may be performed when the HDD is to perform a read operation.

At 304, user data is received from the host 22 via the host interface 16. At 306, the buffer management module 32 stores the user data in the volatile memory (or buffer) 18. At 308, the buffer management module 32 demultiplexes the user data and/or transfers the user data from the buffer 18 to the HDC modules 84, 88 based on the command signal. In one implementation, the buffer management module 32 may transfer first sectors (e.g., odd sectors in a series of sectors) to the first HDC module 84 and second sectors (e.g., even sectors in the series of sectors) to the second HDC module 88. In another implementation, the buffer management module 32 transfers a first portion of a first sector or first portions of the series of sectors to the first HDC module 84 and a second portion of the first sector, a first portion of a second sector, or second portions of the series of sectors to the second HDC module 88.

At 310, the servo motor module 74 positions the head assembly 46. The servo motor module 74 may position the head assembly 46 based on servo feedback signals received from the read/write channel modules 86, 90. At 312, the servo head modules 76, 78 position the heads 70, 72 on a pair of tracks relative to the disk 44 and relative to the actuator arms 116 based on the servo feedback signals.

At 314, the HDC modules 84, 88 transfer the user data to the read/write channel modules 86, 90. This may include transferring, for example, the odd sectors to the first read/write channel module 86 and the even sectors to the second read/write channel module 90. Alternatively, the first portion of the first sector or the first portions of the series of sectors may be transferred to the first read/write channel module 86 and the second portion of the first sector, the first portion of the second sector, or the second portions of the series of sectors may be transferred to the second read/write channel module 90.

At 316, the read/write channel modules 86, 90 may encode the sectors of user data received from the HDC modules 84, 88. The encoding may include adding ECC data to the sectors of user data. The ECC data may be added to each sector and/or each portion of a sector transferred to read/write channel modules 86, 90. For example, ECC data may be added to each of the odd and even sectors by a corresponding one of the encoders 142, 144. As another example, first ECC data may be added to a first portion of a first sector via the first encoder 142 while second ECC data is added to a second portion of the first sector via the second encoder 144. ECC data may be similarly added to portions of other sectors of user data.

At 318, the amplifier modules 100, 102 write the user data and the ECC data on both of the sides 80, 82 via the heads 70, 72 during the same period of time. The first amplifier module 100 writes first user data and first ECC data on the first side 80 while the second amplifier module 102 writes second user data and second ECC data on the second side 82. The first user data may include one or more sectors or only a portion of a sector. The second user data may include one or more sectors or only a portion of a sector.

At 320, the buffer management module 32 may determine whether additional user data is to be written on the disk 44. If there is additional user data to be written on the disk 44, task 304 may be performed, otherwise the method may end at 322.

At 324, the servo motor module 74 positions the head assembly 46 for a read operation based on a control signal received from the buffer management module 32. The control signal may be generated based on a second command signal received from the host 22. The head assembly 46 may be positioned based on the servo feedback signals. At 326, the servo head modules 76, 78 position the heads 70, 72 on a pair of tracks relative to the disk 44 and relative to the actuator arms 116 based on the servo feedback signals.

At 328, the amplifier modules 100, 102 read user data from both of the sides 80, 82 during the same period of time. The first amplifier module 100 reads first user data from the first side 80 while the second amplifier module 102 reads second user data from the second side 82. At 330, the read/write channel modules 86, 90 decode the user data via the decoders 146, 148 including removing the ECC data added during the write operation. The first decoder 146 may decode the first user data while the second decoder 148 decodes the second user data.

At 332, the decoded user data is transferred from the read/write channel modules 86, 90 to the HDC modules 84, 88 during the same period. At 334, the buffer management module 32 multiplexes the user data (including the first test data and the second test data) and/or transfers the user data to the buffer 18.

At 336, the user data transferred to the buffer 18 from the buffer management module 32 is transferred to the host 22 via the host interface 16. At 338, the buffer management module 32 may determine whether additional user data is to be read from the disk 44. If there is additional user data to be read from the disk 44, task 324 may be performed, otherwise the method may end at 322.

The above-described tasks of FIGS. 3-5 are meant to be illustrative examples; the tasks may be performed sequentially, synchronously, simultaneously, continuously, during overlapping periods of time or in a different order depending upon the application. Also, any of the tasks may not be performed or skipped depending on the implementation and/or sequence of events.

The above-described methods include dual-stage actuation of a VCM and head actuators to read from and/or write to both sides of a disk during the same period of time. A head assembly is first moved to perform a coarse adjustment of head positions and then the heads on each side of the disk are moved relative to the disk and actuator arm(s) to perform a fine adjustment. The head assembly may have a larger stroke (maximum displacement) than each of the heads. Although the heads have a more limited stroke than the head assembly, stroke of the heads is large enough and pitch of a disk is small enough to allow the heads to be moved over multiple tracks of a disk. This allows the heads to be positioned along a center of a track (track-following mode) and to provide rapid movement of the head from a current position or track to a target track (track-seeking mode).

As the above-described systems and methods include writing and reading data on both sides of a disk during the same period of time, the data rate to and from the HDD is doubled over traditional systems that write or read to a single side of a disk at a time. The data rate may be doubled without changing a speed of a spindle motor (i.e. rotational speed of a disk) relative to a traditional HDD. For applications that require less power consumption from a HDD, spindle speed of the HDD may be reduced in half, while the data rate is maintained or increased over a traditional HDD. As the data rate may be maintained or increased while reducing rotational speeds of a disk, electronic issues of a HDD may be reduced while increasing signal-to-noise ratios (SNRs) of signals generated when writing to or reading from the disk.

The above-described systems and corresponding methods allow costs of a HDD to be reduced. The systems perform a self-servo write procedure and test procedures including writing to and reading from heads in parallel on both sides of a disk during the same period of time. This reduces times to perform a self-servo write procedure, defect scanning procedures, and other test procedures.

Also as data is read from or written on both sides of a disk, the buffer management module, the HDC modules and/or the read/write channel modules described herein may better recover user data than traditional HDD modules. The improved data recovery may be provided, for example, when a defect is limited to one side of a disk. The disclosed the buffer management module, HDC modules, and read/write channel modules may recover a first portion of a first sector on a first side of a disk based on a second portion of the first sector and/or other adjacent sectors written on either side of the disk. Adjacent sectors may refer to sectors positioned consecutively prior to or subsequent to the defective sector in a series of sectors.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A hard disk drive system comprising:
   a first channel module configured to receive a first data from or transfer the first data to a first amplifier module of a hard disk assembly when reading from or writing to a first surface of a disk of the hard disk assembly, wherein the first channel module is configured to write a first portion of a first sector on the first surface of the disk; and
   a second channel module configured to receive a second data from or transfer the second data to a second amplifier module of the hard disk assembly when reading or writing to a second surface of the disk while the first channel module receives the first data from or transfers the first data to the first amplifier module, wherein the second channel module is configured to write a second portion of the first sector on the second surface of the disk, and wherein the second portion is different than the first portion, and
   wherein, when the first portion of the first sector written on the first surface of the disk is defective, the first channel module is configured to recover the first portion of the first sector on the first surface of the disk based on the second portion of the first sector written on the second surface of the disk.

2. The hard disk drive system of claim 1, further comprising a buffer management module configured to receive sectors of data from or transfer the sectors of data to a buffer, wherein the sectors of data include the first data and the second data.

3. The hard disk drive system of claim 2, wherein the buffer management module is configured to track locations of the first data and the second data in the buffer when reading from or writing to the first surface and the second surface.

4. The hard disk drive system of claim 2, wherein the buffer management module comprises:
   a first access module configured to transfer the first data between the buffer and a first control module; and
   a second access module configured to transfer the second data between the buffer and a second control module while the first access module transfers the first data between the buffer and the first control module.

5. The hard disk drive system of claim 4, wherein:
   the first control module comprises
      a first defect module configured to map defective sectors on the first surface of the disk,
      a first sector tracking module configured to track an access location at which the first data is read from or written to the first surface of the disk, and
      a first formatting module configured to track a first format of the first data;

the second control module comprises
a second defect module configured to map defective sectors on the second surface of the disk,
a second sector tracking module configured to track an access location at which the second data is read from or written to the second surface of the disk, and
a second formatting module configured to track a second format of the second data; and
at least one of the first channel module and the second channel module report a total amount of space on the disk to a host based on the map of the defective sectors on the first surface of the disk and the map of the defective sectors on the second surface of the disk.

6. The hard disk drive system of claim 1, wherein the first channel module is configured to read the first data from the first surface while the second channel module reads the second data from the second surface.

7. The hard disk drive system of claim 1, wherein the first channel module is configured to write the first data to the first surface while the second channel module writes the second data to the second surface.

8. The hard disk drive system of claim 1, wherein:
the first surface is on a first side of the disk; and
the second surface is on a second side of the disk and opposes the first surface.

9. The hard disk drive system of claim 1, further comprising the hard disk assembly, wherein the hard disk assembly comprises:
a first head configured to read the first data from or write the first data to the first surface; and
a second head configured to read the second data from or write the second data to the second surface at a same time as the first head reading the first data from or writing the first data to the first surface.

10. The hard disk drive system of claim 9, further comprising:
a first servo head module configured to generate a first servo signal based on a first feedback signal from the first channel module;
a first driver module configured to drive a first actuator of the first head based on the first servo signal;
a second servo head module configured to generate a second servo signal based on a second feedback signal from the second channel module; and
a second driver module configured to drive a second actuator of the second head based on the second servo signal while the first driver module drives the first actuator.

11. The hard disk drive system of claim 1, further comprising a self-servo write module configured to generate a first servo write signal while generating a second servo write signal, wherein:
the first channel module writes first servo data on the first surface; and
the second channel module writes second servo data on the second surface while the first channel module write the first servo data on the first surface.

12. The hard disk drive system of claim 1, wherein:
the first channel module and the second channel module are configured to perform a self-servo write procedure; and
during the self-servo write procedure, the first channel module is configured to write to the first surface of the disk via a first head while the second channel module writes to the second surface of the disk via a second head.

13. The hard disk drive system of claim 1, wherein:
the first channel module and the second channel module are configured to perform a test procedure; and
during the test procedure, the first channel module is configured to write to or read from the first surface of the disk via a first head while the second channel module writes to or reads from the second surface of the disk via a second head.

14. A method of operating a hard disk drive system, the method comprising
receiving first data from or transferring the first data to a first amplifier module of a hard disk assembly via a first channel module when reading from or writing to a first surface of a disk of the hard disk assembly;
writing a first portion of a first sector on the first surface of the disk via the first channel module;
receiving second data from or transferring the second data to a second amplifier module of the hard disk assembly via a second channel module when reading or writing to a second surface of the disk while receiving the first data from or transferring the first data to the first amplifier module via the first channel module;
writing a second portion of the first sector on the second surface of the disk via the second channel module, and wherein the second portion is different than the first portion; and
when the first portion of the first sector written on the first surface of the disk is defective, recovering the first portion of the first sector written on the first surface of the disk via the first channel module based on the second portion of the first sector written on the second surface of the disk.

15. The method of claim 14, further comprising:
receiving a command signal from a host via a host interface, wherein the command signal is transmitted from the host to the hard disk drive system; and
receiving sectors of data from or transferring the sectors of data to a buffer via a buffer management module based on the command signal, wherein the sectors of data include the first data and the second data.

16. The method of claim 15, further comprising:
generating a first servo signal based on a first feedback signal from the first channel module;
driving a first actuator of a first head based on the first servo signal;
generating a second servo signal based on a second feedback signal from the second channel module;
driving a second actuator of a second head based on the second servo signal while driving the first actuator;
generating a first control signal based on at least one of the first feedback signal from the first channel module and the second feedback signal from the second channel module; and
generating a second control signal to actuate a head assembly based on the first control signal, wherein the head assembly comprises the first head and the second head.

17. The method of claim 14, further comprising:
performing a self-servo write procedure; and
during the self-servo write procedure, writing to the first surface of the disk via a first head using the first channel module while writing to the second surface of the disk via a second head using the second channel module.

18. The method of claim 14, further comprising:
performing a test procedure; and
during the test procedure, writing to or reading from the first surface of the disk via a first head using the first channel module while writing to or reading from the second surface of the disk via a second head using the second channel module.

* * * * *